(12) United States Patent
Roidl et al.

(10) Patent No.: US 12,194,539 B2
(45) Date of Patent: Jan. 14, 2025

(54) METHOD AND APPARATUS FOR FLUID FLOW FOR ADDITIVE MANUFACTURING APPARATUS

(71) Applicants: GE Additive Germany GmbH, Frankfurt am Main (DE); Concept Laser GmbH, Lichtenfels (DE)

(72) Inventors: Benedikt Roidl, Munich (DE); Thomas Fauner, Garching (DE); Peter Pontiller-Schymura, Kulmbach (DE)

(73) Assignees: GE Additive Germany GmbH, Frankfurt am Main (DE); Concept Laser GmbH, Lichtenfels (DE)

( * ) Notice: Subject to any disclaimer, the term of this patent is extended or adjusted under 35 U.S.C. 154(b) by 0 days.

(21) Appl. No.: 18/531,840

(22) Filed: Dec. 7, 2023

(65) Prior Publication Data

US 2024/0131596 A1    Apr. 25, 2024

Related U.S. Application Data

(62) Division of application No. 17/335,861, filed on Jun. 1, 2021, now Pat. No. 11,872,627.

(51) Int. Cl.
| | |
|---|---|
| *B22F 12/70* | (2021.01) |
| *B33Y 30/00* | (2015.01) |
| *B33Y 40/00* | (2020.01) |
| *B22F 10/85* | (2021.01) |
| *B33Y 50/02* | (2015.01) |

(52) U.S. Cl.
CPC .............. *B22F 12/70* (2021.01); *B33Y 30/00* (2014.12); *B33Y 40/00* (2014.12); *B22F 10/85* (2021.01); *B33Y 50/02* (2014.12)

(58) Field of Classification Search
CPC ................... B23K 15/086; B28B 1/001; B22F 2003/1057
See application file for complete search history.

(56) References Cited

U.S. PATENT DOCUMENTS

| | | | |
|---|---|---|---|
| 9,669,583 B2 | 6/2017 | Ferrar | |
| 9,776,362 B2 | 10/2017 | Chuang et al. | |

(Continued)

FOREIGN PATENT DOCUMENTS

| | | |
|---|---|---|
| WO | WO2020/041438 A1 | 2/2020 |
| WO | WO2020/041451 A1 | 2/2020 |
| WO | WO2020125837 A1 | 6/2020 |

*Primary Examiner* — Nicholas A Wang
(74) *Attorney, Agent, or Firm* — Dority & Manning, P.A.

(57) ABSTRACT

A fluid flow apparatus configured to provide a flow of fluid with particular flow profiles to a process chamber of an additive manufacturing apparatus is provided. The fluid flow apparatus includes a plurality of openings forming a first flow region, a second flow region, a third flow region, and a fourth flow region in adjacent arrangement along an axis in the process chamber between the build platform and the laser window. A controller is configured to execute instructions that perform operations that include flowing, via the second flow region, the flow of fluid along a second distance along the axis at a second velocity range between approximately 1.0 meters per second (m/s) and 6.0 m/s, and flowing, via the fourth flow region, another flow of fluid along a fourth distance along the axis at a fourth velocity range between approximately 0.1 m/s and 4.5 m/s.

9 Claims, 4 Drawing Sheets

(56) References Cited

U.S. PATENT DOCUMENTS

| | | |
|---|---|---|
| 9,989,396 B2 | 6/2018 | Gold et al. |
| 2018/0133967 A1* | 5/2018 | Bechmann ............. B33Y 30/00 |
| 2020/0061653 A1 | 2/2020 | Wakelam et al. |
| 2020/0061655 A1* | 2/2020 | Wakelam ................. B05B 12/32 |
| 2020/0061656 A1* | 2/2020 | Shalaby ................. B22F 10/77 |

* cited by examiner

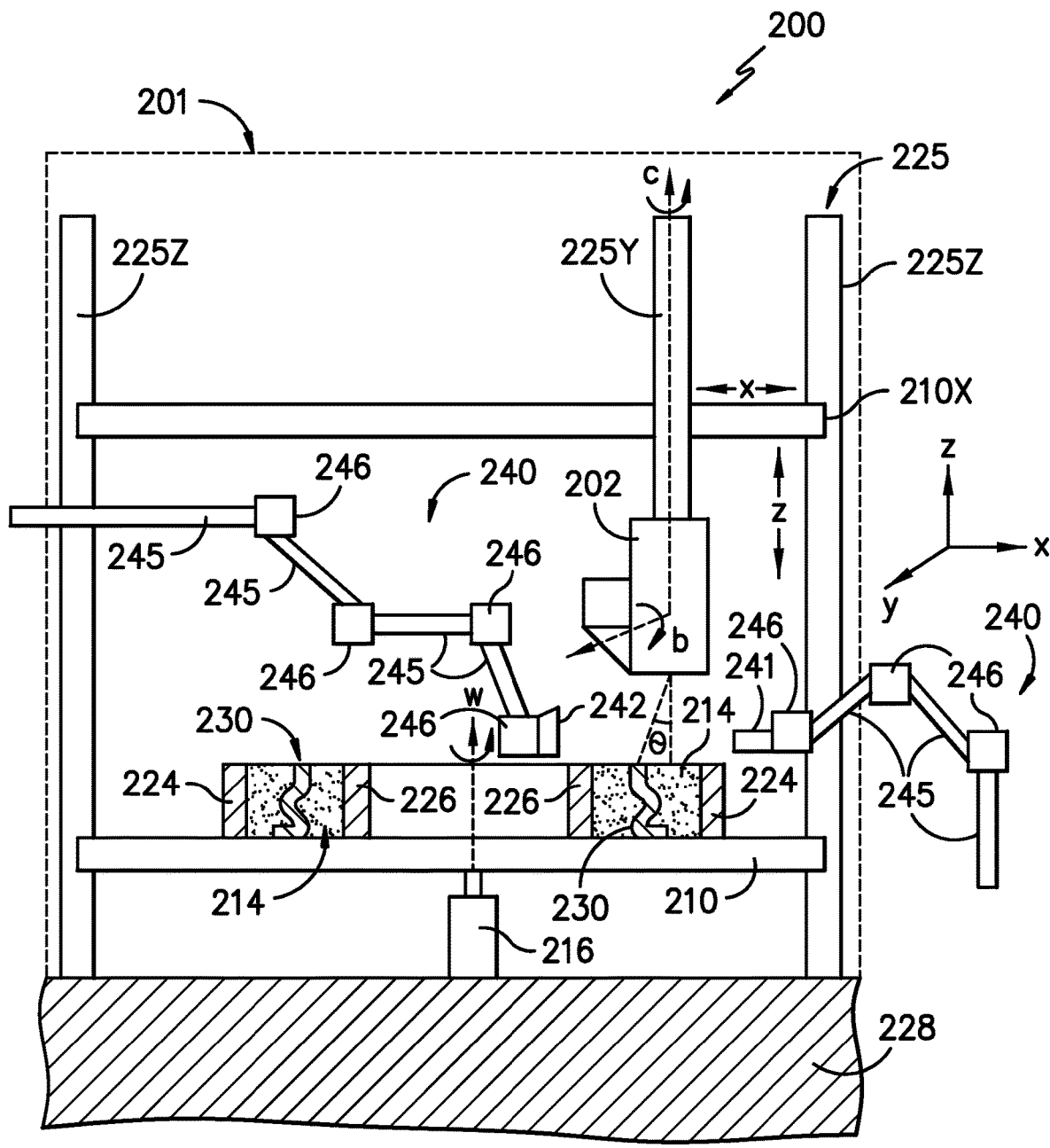
FIG. -1-

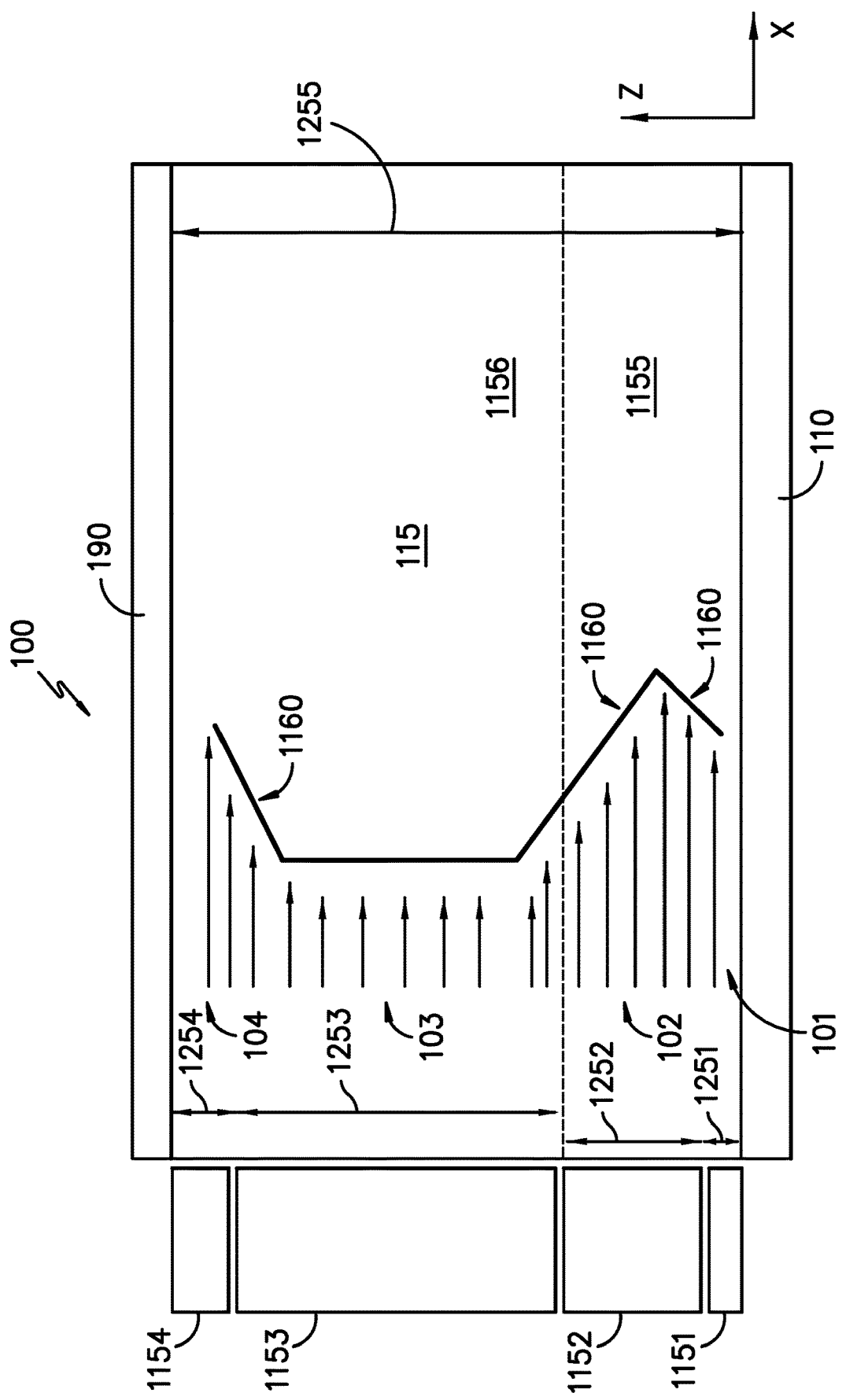
FIG. -2-

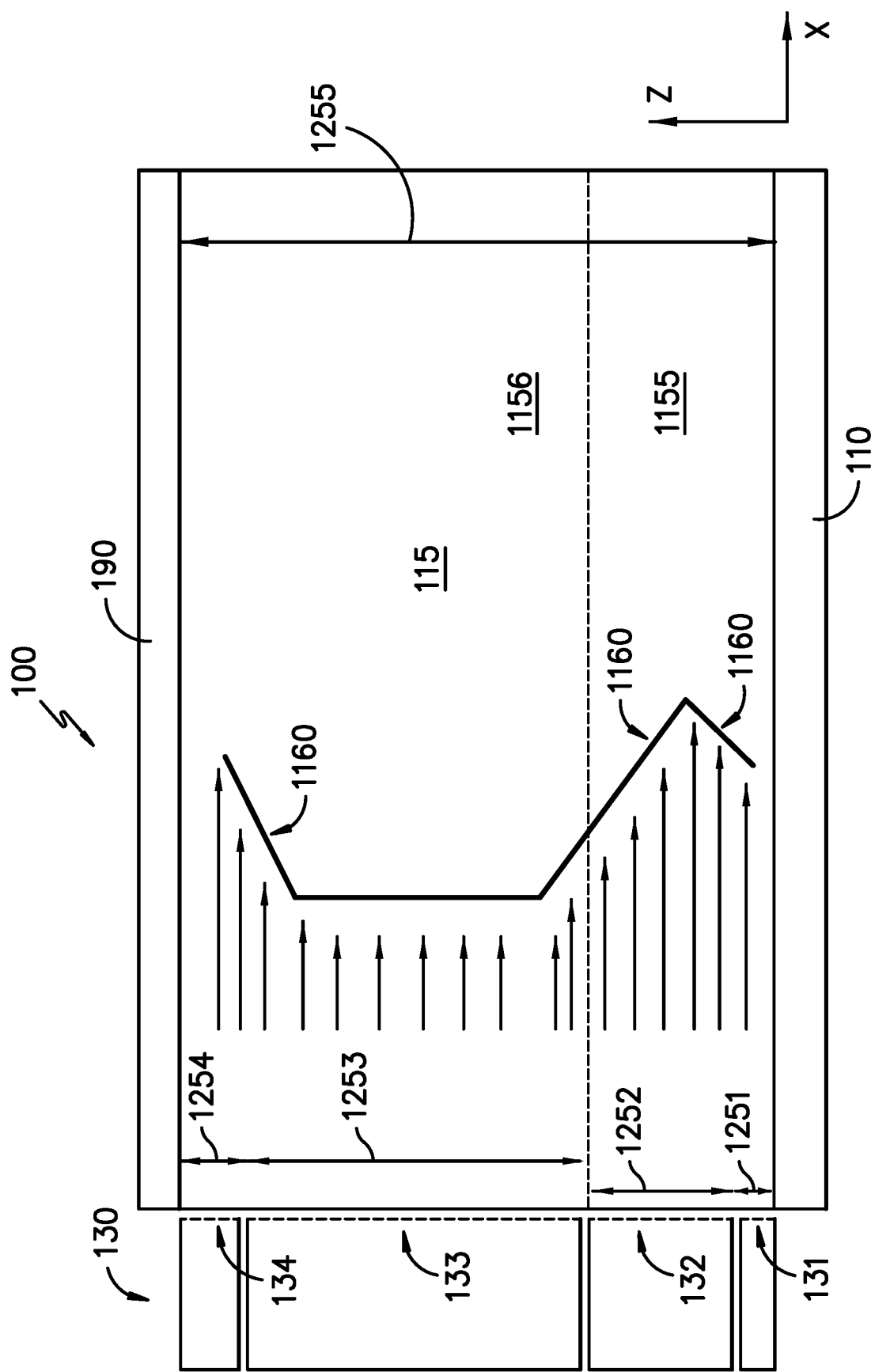
FIG. -3-

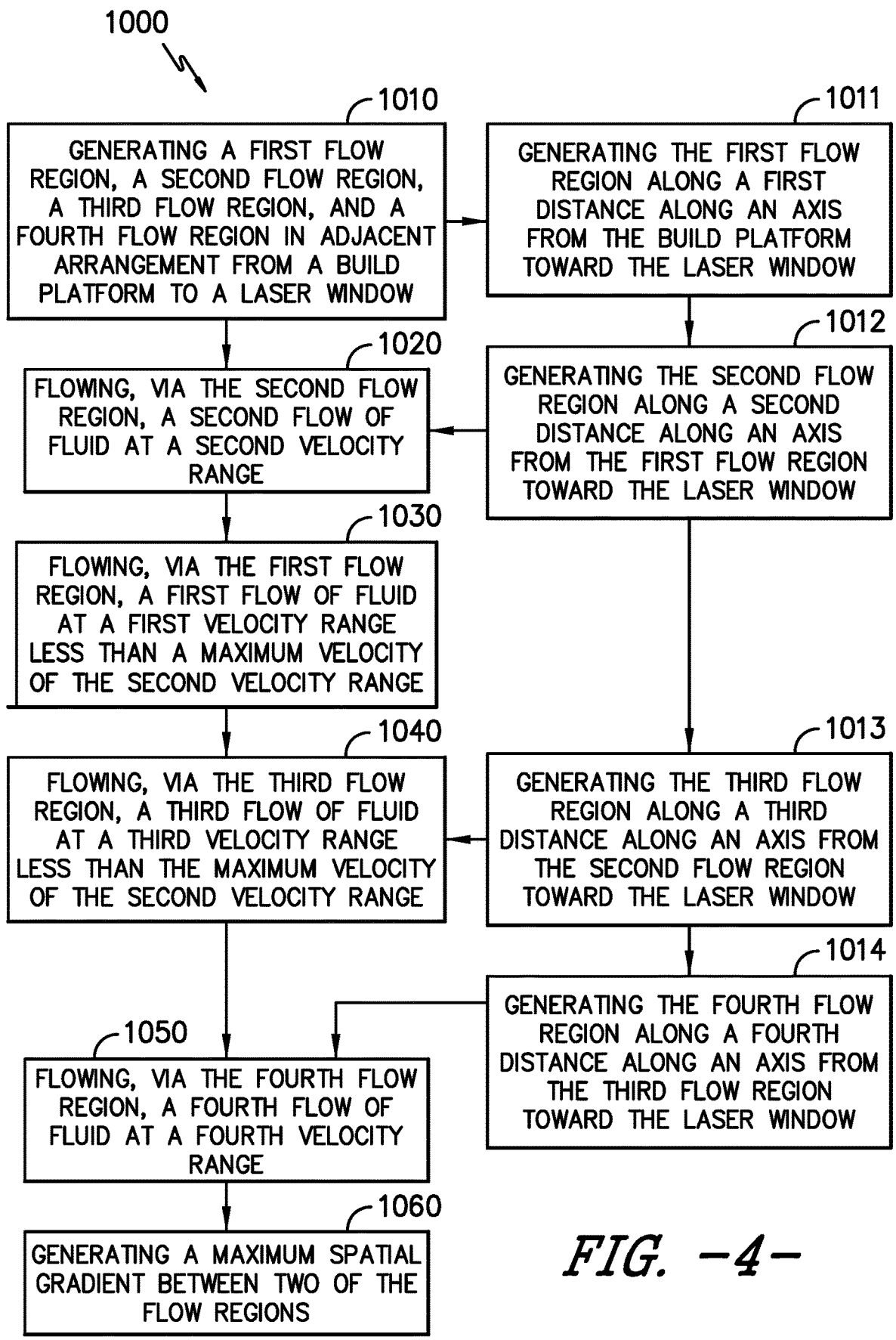
FIG. -4-

METHOD AND APPARATUS FOR FLUID FLOW FOR ADDITIVE MANUFACTURING APPARATUS

CROSS-REFERENCE TO RELATED APPLICATIONS

This application is a divisional of U.S. patent application Ser. No. 17/335,861 filed Jun. 1, 2021, the content of which is incorporated herein by reference in its entirety as if set forth verbatim.

FIELD

The present disclosure generally relates to an additive manufacturing apparatus. More specifically, the present disclosure relates to a fluid flow mechanism and method for operation therefor for an additive manufacturing apparatus.

BACKGROUND

Additive manufacturing (AM) encompasses a variety of technologies for producing components in an additive, layer-wise fashion. In powder bed fusion, a focused energy beam is used to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

Debris, soot, smoke, spatter, or other undesired particulate matter may form near the fused layer. Soot and smoke at a process chamber between the laser window and the build platform can attenuate the irradiation beam, which may result in decreased energy at the desired fuse area and defective fusing. Debris, spatter, or other particulate matter at the powder bed may partially fuse into the part, which may lead to porosity, defective fusion, or other defects.

As such, there is a need for structures and methods for removing debris, soot, spatter, or other particulate matter from the process chamber. Still further, there is a need for structures and methods for mitigating or eliminating defects resulting from undesired particulate matter. Furthermore, there is a need for structures for removing undesired particulate matter from the additive manufacturing apparatus.

BRIEF DESCRIPTION

Aspects and advantages of the invention will be set forth in part in the following description, or may be obvious from the description, or may be learned through practice of the invention.

An aspect of the present disclosure is directed to an additive manufacturing (AM) apparatus including a build unit having a laser window through which an irradiation beam is directed toward a build platform. A reference distance is extended between the build platform and the laser window. A fluid flow apparatus includes a plurality of openings forming a first flow region between 0.1% and 10% of the reference distance, a second flow region between 2% and 50% of the reference distance, a third flow region including at least 20% of the reference distance, and a fourth flow region including 20% or less of the reference distance. The first flow region, the second flow region, the third flow region, and the fourth flow region are in adjacent arrangement along the reference distance in an area between the build platform and the laser window. The first flow region is proximate to the build platform and distal to the laser window. The fourth flow region is proximate to the laser window and distal to the build platform. A controller is configured to execute instructions that perform operations. The operations include flowing, via the second flow region, a flow of fluid at a second velocity range between approximately 1.0 meters per second (m/s) and 6.0 m/s; and flowing, via the fourth flow region, another flow of fluid at a fourth velocity range between approximately 0.1 m/s and 4.5 m/s.

Another aspect of the present disclosure is directed to an additive manufacturing (AM) apparatus including a fluid flow apparatus is provided. The AM apparatus includes a build unit including a laser or irradiation beam directing mechanism. The irradiation beam directing mechanism includes a laser window through which a laser or irradiation beam is directed toward a build platform. A reference axis is extended between the build platform and the laser window. The fluid flow apparatus includes a plurality of openings forming a first flow region, a second flow region, a third flow region, and a fourth flow region in adjacent arrangement along the axis in an area between the build platform and the laser window. The first flow region is proximate to the build platform and distal to the laser window, and the fourth flow region is proximate to the laser window and distal to the build platform. A controller is configured to execute instructions that perform operations. The operations include flowing, via the second flow region, a flow of fluid along a second distance at a second velocity range between approximately 1.0 meters per second (m/s) and 6.0 m/s. The second distance is up to 200 millimeters from the first flow region, and the first flow region is extended along a first distance up to 15 mm from the build platform. The operations further include flowing, via the fourth flow region, another flow of fluid along a fourth distance at a fourth velocity range between approximately 0.1 m/s and 4.5 m/s, in which the fourth distance is up to 40 mm from the third flow region.

Yet another aspect of the present disclosure is directed to a method for operating an additive manufacturing apparatus is provided. The method includes generating a first flow region, a second flow region, a third flow region, and a fourth flow region in sequential adjacent arrangement from a build platform to a laser window, wherein the first flow region is proximate to the build platform, and wherein the fourth flow region is proximate to the laser window; flowing, via the second flow region, a flow of fluid along a second distance at a second velocity range between approximately 1.0 meters per second (m/s) and 6.0 m/s, wherein the second distance is up to 200 millimeters from the first flow region, and wherein the first flow region is extended along a first distance up to 15 mm from the build platform; and flowing, via the fourth flow region, another flow of fluid along a fourth distance at a fourth velocity range between approximately 0.1 m/s and 4.5 m/s, wherein the fourth distance is up to 40 mm from the third flow region.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram showing a front view, cross section of an additive manufacturing apparatus according to an aspect of the present disclosure;

FIG. 2 illustrates a schematic embodiment of a fluid flow apparatus for an additive manufacturing apparatus according to an aspect of the present disclosure;

FIG. 3 illustrates a schematic embodiment of a fluid flow apparatus for an additive manufacturing apparatus according to an aspect of the present disclosure; and FIG. 4 illustrates a flowchart outlining steps for a method for control for a fluid flow mechanism for an additive manufacturing apparatus according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "recirculation" refers to flows that are at least 20 millimeters (mm) in diameter. "Recirculation flow" may refer to laminar flows or turbulent flows, unless otherwise specified. The phrase "recirculation-free" refers to the elimination or mitigation of rotating flow structures of 20 millimeters (mm) or greater in diameter. Embodiments of the structure and method for fluid flow provided herein allow for recirculation-free flow, or substantially reduced or mitigated recirculation, such as described herein. It should be appreciated that "recirculation-free" may refer to laminar flow or turbulent flow.

The present disclosure provides embodiments of an apparatus that may be used to perform powder-based additive layer manufacturing. Examples of powder-based additive layer manufacturing include but are not limited to selective laser sintering (SLS), selective laser melting (SLM), direct metal laser sintering (DMLS), direct metal laser melting (DMLM) and electron beam melting (EBM) processes.

An additive manufacturing apparatus provided herein includes a build unit assembly. The build unit assembly includes certain build components, including, a powder recoating mechanism and an irradiation beam directing mechanism. The build unit is attached to a positioning mechanism that allows two- or three-dimensional movement (along x-, y- and z-axes) throughout the build environment, as well as rotation of the build unit in a way that allows leveling of the powder in any direction desired. The positioning mechanism may be a gantry, a delta robot, a cable robot, a robotic arm, a belt drive, or other appropriate positioning mechanism.

Various embodiments of the additive manufacturing apparatus may further include a rotating build platform, or any appropriate additive manufacturing machine where the scan head moves relative to the build platform. For example, the build platform may include an X, Y, Z gantry system where the processing area moves about the build platform. Particular embodiments of the build platform include a substantially circular configuration. However, it should be appreciated that other embodiments may include other shape configurations. In certain embodiments, the build unit of the apparatus is mobile, which may eliminate the need to lower the build platform as successive layers of powder are built up. In a still particular embodiments, the rotating build platform of the present disclosure is vertically stationary.

A fluid flow mechanism, controller, and control method for operation is provided herein for an additive manufacturing apparatus. The method provides steps for generating fluid flow velocity profiles at a process chamber for improving flow pump efficiency and allowing for undesired particulate matter removal while mitigating or eliminating undesired removal or pickup of powder material. The apparatus includes several sections of openings configured to generate desired fluid flow velocity profiles at the process chamber. Additionally, or alternatively, the method for control provides for steps to generate the desired fluid flow velocity profiles at respective sections of the process chamber.

FIG. 1 depicts a schematic representation of an additive manufacturing apparatus 200 of an embodiment of the present disclosure. The apparatus 200 may include a build enclosure 201 housing the entire apparatus 200 and object 230 to be built. The apparatus 200 includes a build unit 202 and a build platform 210. During operation, the apparatus builds an object 230 in a powder bed 214 formed between one or both of an outer grown build envelope 224 or an inner build envelope 226. The object 230 may be a large annular object, such as, but not limited to, a turbine or vane shrouding, a central engine shaft, a casing, a compressor liner, a combustor liner, a duct, an array of smaller objects arranged onto the large build platform, etc.

The build unit 202 may be configured to include several components for additively manufacturing a high-precision, large-scale object or multiple smaller objects. A mobile build unit 202 includes a powder delivery mechanism, a powder recoating mechanism, a gas-flow mechanism with a gas-flow zone and an irradiation beam directing mechanism.

The build unit positioning mechanism 225 may be an X-Y-Z gantry that has one or more x-crossbeams 225X (one shown in FIG. 1) that independently move the build unit 202 along the x-axis (i.e. left or right), one or more y-crossbeams 225Y (one shown in FIG. 1) that respectively move the build unit 202 along the y-axis (i.e. inward or outward). Such two-dimensional movements across the x-y plane are substantially parallel to the build platform 210 or a build area therewithin. Additionally, the build unit positioning mechanism 225 has one or more z-crossbeams 225Z (two shown in FIG. 1) that moves the build unit 202 along the z-axis (i.e. upward and downward or substantially perpendicular to the build platform 210 or a build area therewithin). The build unit positioning mechanism 225 is further operable to rotate the build unit 202 around the c-axis and also the b-axis. The build unit positioning mechanism 225 may also be a robotic arm (not shown) or other suitable mechanism as desired.

The build platform 210 may be a rigid, ring-shaped or annular structure (i.e. with an inner central hole) configured to rotate 360° around the center of rotation W, or the build platform may be a disk without a central hole. The rotating build platform 210 may be secured to an end mount of a motor 216 that is operable to selectively rotate the rotating build platform 210 around the center of rotation W such that the build platform 210 moves in a circular path. The motor 216 may be further secured to a stationary support structure 228. The motor may also be located elsewhere near the apparatus and mechanically connected with the build platform via a belt for translating motion of the motor to the build platform. Alternatively, the build platform 210 may be a rectangular or other structure configured to translate to selectively move the build platform 210 relative to the process area.

Referring now to FIG. 2, a schematic is provided of a fluid flow apparatus 100 for an additive manufacturing apparatus. The fluid flow apparatus 100 may be included with the additive manufacturing apparatus 200 depicted and described in regard to FIG. 1. However, it should be appreciated that the fluid flow apparatus 100 may be included with other appropriate additive manufacturing apparatuses including a laser window 190 for an irradiation beam, such as of the mobile build unit 202 in FIG. 1, separated along the z-axis from a build platform 110, such as the build platform 210 in FIG. 1.

The apparatus 100 forms an area 115 between the build platform 110 and the laser window 190 along a reference distance 1255 along the z-axis. The reference distance 1255 is extended along the z-axis and is a dimension from the build platform 110 to the laser window 190. The apparatus 100 forms at the area 115 a first flow region 1151 defining a lower transition flow region proximate to the build platform 110 and distal to the laser window 190 along the z-axis. The apparatus 100 further forms at the area 115 a second flow region 1152 defining a lower flow region adjacent and outward along the z-axis from the first flow region 1151.

The apparatus 100 further forms at the area 115 a fourth flow region 1154 defining an upper flow region proximate to the laser window 190 and distal to the build platform 110 along the z-axis. The apparatus 100 further forms at the area 115 a third flow region 1153 defining an upper transition flow region adjacent and inward along the z-axis from the upper flow region 1154. The third flow region 1153 is positioned between the fourth flow region 1154 and the second flow region 1152 along the z-axis.

In various embodiments described below, the first flow region 1151, the second flow region 1152, the third flow region 1153, and the fourth flow region 1154 are in sequential adjacent arrangement along the z-axis between the build platform 110 and the laser window 190.

As further described herein, the apparatus 100 is configured to flow a process fluid, such as an inert gas or other appropriate fluid for removing undesired particulate matter, along a first direction along the x-axis from a plurality of openings through a process chamber, such as depicted at area 115. It should be appreciated that the apparatus, openings, flow profiles, and regions depicted and described herein may extend substantially uniformly along the y-axis. Distances, velocities, gradients, ratios, etc. depicted herein along a plane defined by the z-axis and x-axis are extended substantially along the y-axis. Particularly, regions depicted and described herein are substantially aligned along the x-axis and the y-axis with the laser window 190. For instance, the fourth flow region 1154 is defined proximate to the laser window. Otherwise, the third flow region 1153 is extended to a ceiling of the build chamber. Embodiments of the structure and methods provided herein may provide flow speeds across the y-axis of the build platform within a deviation of +/−15%. It should be appreciated by those skilled in the art that flows at the build chamber described herein may exclude corners and/or edges, or edges or corners along the z-axis. Excluded areas may form less than 2% of an area of the build platform at which fluid flows described herein may be applied.

In various embodiments, the first flow region 1151 and the second flow region 1152 together define a build platform flow region 1155. In still various embodiments, the third flow region 1153 and the fourth flow region 1154 together define a process chamber flow region 1156. The first flow region 1151 and the second flow region 1152 together provide a flow of fluid proximate to the build platform 110 to remove undesired particulate matter from the build platform 110, such as soot, smoke, spatter, or undesired debris generally. The third flow region 1153 and the fourth flow region 1154 together provide a flow of fluid proximate to the laser window 190 for cleaning the laser optics. The third flow region 1153 and the fourth flow region 1154 may further mitigate undesired particulate matter build-up at the laser window, provide thermal attenuation, or other desired purposes at or near the laser window 190.

Embodiments of the apparatus 100 provided herein include structures or methods for control that generate particular ranges and gradients of flow velocity across particular ranges in the area 115 along the z-axis, such as to mitigate or eliminate undesired flow recirculation that undesirably reduces system efficiency, removes desired powder material, or generally reduces performance related to removing undesired particulate matter or cleaning the laser window. In particular embodiments, regions depicted and described, and generation thereof, are defined particularly along the z-axis above the build platform to the exclusion of walls, regions, or features upstream or downstream (e.g., along the x-axis) of the build platform.

The fourth flow region 1154 and the second flow region 1152 are each configured to output respective velocity ranges providing a maximum flow rate at the area 115. The fourth flow region 1154 is configured to output a fourth flow of fluid, depicted schematically via arrows 104. The second flow region 1152 is configured to output a second flow of fluid, depicted schematically via arrows 102. In certain embodiments, the fourth velocity range and the second velocity range each include the maximum velocity of flow of fluid at the area 115. In particular embodiments, the fourth velocity range is between approximately 0.1 meters per second (m/s) and approximately 6.0 m/s. In another embodiment, the fourth velocity range is between approximately 2.0 m/s and approximately 4.5 m/s. In a still particular embodiment, the second velocity range is between approximately 1.0 m/s and approximately 6.0 m/s. In various embodiments, the second velocity range is up to 4.5 m/s. In still another embodiment, the second velocity range is at least 2.5 m/s.

The first flow region 1151 is configured to output a first flow of fluid, depicted schematically via arrows 101, with a first velocity range less than the maximum velocity of the second velocity range. The first flow region 1151 is extended along a first distance 1251 along the z-axis from the build platform 110 toward the laser window 190. In various embodiments, the first flow region 1151 is extended along the first distance 1251, and the first distance 1251 is at least 0.1% of the reference distance 1255 from the build platform 110 to the laser window 190 along the z-axis. In certain embodiments, the first distance 1251 is 10% or less of the reference distance 1255. In a particular embodiment, the first distance 1251 is up to approximately 15 millimeters (mm) from the build platform 110. The first velocity range has a maximum velocity of approximately 2 m/s within the first distance at which the first flow region 1151 is formed. In certain embodiments, the first velocity range is approximately zero m/s within the first distance at which the first flow region 1151 is formed. Stated differently, the first flow region 1151 may form a flow blocker region between the build platform and the flow of fluid. Furthermore, the process flow fluid may be introduced at the second flow region 1152.

The second flow region 1152 is extended along a second distance 1252 along the z-axis from the first flow region 1151 toward the laser window 190. In various embodiments, the second flow region 1152 is extended along the second distance 1252, and the second distance 1252 is at least 2% of the reference distance 1255 along the z-axis between the build platform 110 and the laser window 190. In certain embodiments, the second distance 1252 is 50% or less of the reference distance 1255. In various embodiments, the second distance 1252 is approximately 200 mm or less. In certain embodiments, the second distance 1252 is up to approximately 120 mm. In still certain embodiments, the second distance 1252 is up to approximately 60 mm. In a particular embodiment, the second distance 1252 is at least 10 mm. As such, the particular ranges of velocity and distance at the second flow region 1152 may allow for removal of soot or other undesired particulate matter while the particular ranges of velocity and distance at the first flow region 1151 prevent undesired removal of powder material.

In various embodiments, the third flow region 1153 is directly adjacent to the second flow region 1152. The third flow region 1153 is extended along a third distance 1253 along the z-axis from the second flow region 1152 toward the laser window 190. In various embodiments, the third flow region 1153 is extended along the third distance 1253, and the third distance 1253 is at least 20% of the reference distance 1255 between the build platform 110 and the laser window 190. In still various embodiments, the third distance 1253 is 90% or less of the reference distance 1255. In certain embodiments, the third distance 1253 is approximately 600 mm or less. In still certain embodiments, the third distance 1253 is extended up to approximately 400 mm. In a particular embodiment, the third distance 1253 is extended between 300 mm and 500 mm. In various embodiments, the third distance 1253 is at least approximately 15 mm. In still various embodiments, the third flow region 1153 is configured to output a third flow of fluid, depicted schematically via arrows 103, with a third velocity range less than the maximum velocity of the second velocity range and the fourth velocity range. In various embodiments, the third velocity range is greater than zero m/s along the first direction along the x-axis (i.e., along a direction extended from openings at the apparatus 100). In a particular embodiment, the third velocity range is at least 0.1 m/s at the third flow region 1153.

The fourth flow region 1154 is extended along a fourth distance 1254 along the z-axis from the third flow region 1153 toward the laser window 190. In various embodiments, the fourth flow region 1154 is extended along the fourth distance 1254, and the fourth distance 1253 is at least 0.5% of the reference distance 1255 between the build platform 110 and the laser window 190. In still various embodiments, the fourth distance 1253 is 20% or less of the reference distance 1255. In various embodiments, the fourth distance 1254 is approximately 40 mm or less. In certain embodiments, the fourth distance 1254 is approximately 20 mm or less. In still certain embodiments, the fourth distance 1254 is at least 3 mm.

It should be appreciated that those skilled in the art will understand that the reference distance 1255 is 100% of the dimension or range from the build platform 110 and the laser window 190. Combinations of ranges of percentages provided herein of the first distance 1251, second distance 1252, third distance 1253, and fourth distance 1254, and the corresponding flow regions, will sum accordingly to 100%. In certain embodiments, the reference distance 1255 is approximately 1000 mm. In other embodiments, the reference distance 1255 is greater or lesser than 1000 mm, in accordance with the ranges provided herein. One skilled in the art will understand that embodiments including one or more maximum percentage values of distances provided herein will correspondingly reduce the remaining range of the percentages of other distances in the particular embodiment. Furthermore, the accordingly reduced ranges will be at least the minimum percentage provided herein. Embodiments of ranges of percentages provided herein may be combined with one or more embodiments of discrete distances (e.g., provided in various embodiments in millimeters), or ranges thereof, to yield further embodiments configured to generate the flow profiles and benefits described herein.

Referring now to FIG. 3, a schematic depiction of the apparatus 100 is provided based on depiction and description of the apparatus 100 in FIG. 2. In various embodiments, the fluid flow apparatus 100 includes a body 130 at which a plurality of openings corresponding to the respective flow regions 1151, 1152, 1153, 1154 (FIG. 2) is formed. The body 130 forms a first opening 131 corresponding at least in part to the first flow region 1151. The body 130 further forms a second opening 132 corresponding to the second flow region 1152. The body 130 forms a third opening 133 corresponding to the third flow region 1153. The body 130 furthermore forms a fourth opening 134 corresponding to the fourth flow region 1154. In various embodiments, the openings are formed through the body 130 along the z-axis and may further extended along the y-axis. It should be appreciated that the respective openings may be formed as a plurality of the respective openings (i.e., a plurality each of the first opening 131, the second opening 132, the third opening 133, and the fourth opening 134) in adjacent arrangement along the y-axis and/or the z-axis. In other embodiments, the respective openings may be formed as a slot extended along the y-axis.

The respective openings at the body 130 may be formed via orifices, nozzles, or other structures configured to desirably limit the flow rate through the respective openings and into the area 115. Additionally, or alternatively, the fluid flow apparatus 100 may be configured to output separate flow rates through the respective openings in accordance to the flow regions depicted and described above. In a particular embodiment, the fluid flow apparatus 100 may include a portion corresponding to the first distance 1251 at which no openings are positioned between the first opening 131 and the build platform 110, such as to allow for zero m/s or approximately zero m/s flow as described herein.

It should be appreciated that the apparatus 100 and method for control will generate respective velocity gradients 1160 between each respective adjacent pair of flow regions 1151, 1152, 1153, 1154. In various embodiments, the apparatus 100 and method for control are each configured to generate a maximum spatial gradient as an absolute value and as a function of discrete values within the ranges of the third distance 1253, the second velocity range, the third velocity range, and the fourth velocity range provided herein. The maximum spatial gradient is a function of the parameters such as follows:

$$\varepsilon_1 = \left| \frac{u_{upperflow} + u_{lowerflow}}{u_{transitionflow,1}} \frac{h_n}{h_{transition,1}} \right|$$

in which $u_{upperflow}$ is a fourth velocity value within the fourth velocity range; $u_{lowerflow}$ is a second velocity value within the second velocity range; $u_{transition\,flow,\,1}$ is a third velocity value within the third velocity range; $h_{transition,1}$ is a distance within the range of third distance 1253, and $h_n$ is a fixed reference length, such as 10 mm. The method for control and the apparatus provided here are configured to control and maintain $\varepsilon_1$ to an absolute value of less than or equal to 1 and greater than zero to avoid flow recirculation at the third flow region 1153.

The method for control and the apparatus provided here may further be configured to provide a maximum spatial gradient as an absolute value and as a function of the parameters such as follows:

$$\varepsilon_2 = \left| \frac{u_{lowerflow}}{u_{transitionflow,2}} \frac{h_n}{h_{transition,2}} \right|$$

in which $u_{lowerflow}$ is a second velocity value within the second velocity range; $u_{transition\,flow,\,2}$ is first velocity value within the first velocity range; $h_{transition,2}$ is a distance within the range of first distance 1251, and $h_n$ is a fixed reference length, such as 10 mm. The method for control and the apparatus provided here are configured to control and maintain $\varepsilon_2$ to an absolute value of less than or equal to 1 and greater than zero to desirably limit wall shear stresses at the powder bed. As such, embodiments of the apparatus and method provided herein may mitigate undesired powder material displacement from the build platform and reduce fluid and material waste at additive manufacturing machines In various embodiments, the apparatus 100 and method for control is configured to generate a maximum spatial gradient of approximately 100 l/s. In a particular embodiment, the apparatus 100 and the method is configured to generate the maximum spatial gradient between the maximum velocity at the fourth flow region 1154 and the minimum velocity at the third flow region 1153. In a still particular embodiment, the apparatus 100 and the method is configured to generate the maximum spatial gradient from 4.5 m/s at the fourth flow region 1154 to 0.1 m/s at the third flow region 1153. In still particular embodiments, the apparatus 100 and the method is configured to generate the maximum spatial gradient between the maximum velocity at the second flow region 1152 and the minimum velocity at the third flow region 1153. In a still particular embodiment, the apparatus 100 and the method is configured to generate the maximum spatial gradient from 4.5 m/s at the second flow region 1152 to 0.1 m/s at the third flow region 1153. The particular range(s) provided herein, such as e.g., the maximum spatial gradient, may prevent recirculation flow structures in the build chamber area directly above the build platform.

In certain embodiments, the apparatus 100 and method is configured to generate a velocity ratio of 1/8 or greater between the respective regions 1151, 1152, 1153, 1154. In a particular embodiment, the velocity ratio is less than 1 and at least 1/8.

Particular absolute value ranges of the spatial gradient or velocity ratio provided above may mitigate undesired flow recirculation or other flow characteristics in the area 115. The particular ranges between the fourth flow region 1154, the third flow region 1153, and the second flow region 1152 may mitigate undesired flow recirculation or tumbling between the build platform 110 and the laser window 190, which may mitigate shear stresses at the build platform 110, reduce fluid flow rate volume, and improve efficiency of the additive manufacturing apparatus 200. The particular ranges between the second flow region 1152 and the first flow region 1151 may mitigate undesired pick-up or diffusion of powder material at the build platform 110, such as to improve efficiency of the additive manufacturing apparatus 200, reduce material waste, and decrease undesired diffusion or displacement of powder material from the build platform 110.

It should be appreciated that the apparatus and method depicted and described herein include particular ranges of flow rates, gradients, ratios, percentages, and distances that, separately or in combination, particularly allow for a combination of cleaning or clearing of a laser window, mitigating undesired powder material displacement from the build platform, and reducing fluid and material waste at additive manufacturing machines. Conventional flow devices and additive manufacturing machines may allow for one or more flow rates or maximum flow rates proximate to a build platform or a laser window. However, embodiments of the apparatus and method depicted and described herein disclose particular ranges of flow rates, gradients, ratios, percentages, distances, structures and method steps for control thereof, that allow for effective cleaning at the laser window while mitigating powder material pick-up and fluid waste, such as via reducing or eliminating fluid recirculation in the area between the build platform and the laser window.

Representative examples of suitable powder materials for embodiments of the apparatus depicted and described herein may include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

Referring now to FIG. 4, an outline of steps for a method for controlling a fluid flow mechanism for an additive manufacturing apparatus is provided (hereinafter, "method 1000"). The method 1000 may be executed with the additive manufacturing apparatus 200 depicted and described in regard to FIGS. 1-3, or with the fluid flow apparatus 100 depicted and described in regard to FIGS. 2-3 particularly. However, various embodiments of the method 1000 may be executed with additive manufacturing apparatuses and fluid flow mechanisms other than those depicted herein. Additionally, steps of the method 1000 may be stored as instructions in a computing system or computing device, such as a controller 1210 depicted and described elsewhere herein. Furthermore, steps of the method 1000 may be executed as operations for an additive manufacturing apparatus of a fluid flow mechanism for an additive manufacturing apparatus.

The method 1000 includes at 1010 generating a first flow region, a second flow region, a third flow region, and a fourth flow region in adjacent arrangement from a build platform to a laser window, such as along the z-axis. The first flow region is proximate to the build platform and the fourth flow region is proximate to the laser window, such as depicted and described in regard to FIGS. 2-3. The flows provided through the respective flow regions are along an axis perpendicular to the adjacent arrangement of the flow regions, such as along the x-axis, or generally parallel to the build platform and/or laser window.

The method 1000 further includes at 1020 flowing, via the second flow region, a second flow of fluid at a second velocity range between within one or more of the ranges described above, or portions of the ranges described above.

At 1030, the method 1000 includes flowing, via the first flow region, a first flow of fluid at a first velocity range less than a maximum velocity of the second velocity range.

At 1040, the method 1000 includes flowing, via the third flow region, a third flow of fluid at a third velocity range less than the maximum velocity of the second velocity range. In a particular embodiment, the method 1000 includes at 1042 flowing the third flow of fluid at least 0.1 m/s at the third flow region.

At 1050, the method 1000 includes flowing, via the fourth flow region, a fourth flow of fluid at a fourth velocity range within one or more of the ranges described above, or portions of the ranges described above.

Various embodiments of the method 1000 include at 1060 generating a maximum spatial gradient between two of the flow regions, wherein the maximum spatial gradient is approximately 100 l/s. In certain embodiments, the maximum spatial gradient is a function of the third distance at the third flow region, the fourth velocity range, and the second velocity range, such as described above. In a particular embodiment, the maximum spatial gradient is from 4.5 m/s to 0.1 m/s. In still various embodiments, the method 1000 includes at 1070 generating a velocity ratio between two of the flow regions, wherein the velocity ratio is 1/8 or greater, such as depicted and described in regard to FIGS. 2-3.

In one embodiment, the method 1000 includes at 1011 generating the first flow region along a first distance along an axis (e.g., the z-axis) from the build platform toward the laser window, wherein the first distance is up to 15 millimeters.

In another embodiment, the method 1000 includes at 1012 generating the second flow region along a second distance along an axis (e.g., the z-axis) from the first flow region toward the laser window, wherein the second distance is up to 200 millimeters. In certain embodiments, the second distance is extended to at least 15 mm from the first flow region.

In yet another embodiment, the method 1000 includes at 1013 generating the third flow region along a third distance along an axis (e.g., the z-axis) from the second flow region toward the laser window, wherein the third distance is up to 600 millimeters. In certain embodiments, the third distance is extended to at least 15 mm from the second flow region.

In still another embodiment, the method 1000 includes at 1014 generating the fourth flow region along a fourth distance along an axis (e.g., the z-axis) from the third flow region toward the laser window, wherein the fourth distance is up to 40 millimeters. In certain embodiments, the fourth distance is extended to at least 3 mm from the third flow region.

Referring back now to FIG. 1, the apparatus 200 may further include a controller 1210 configured to execute steps of the method 1000. In various embodiments, the controller 1210 can generally correspond to any suitable processor-based device, including one or more computing devices. For instance, FIG. 1 illustrates one embodiment of suitable components that can be included within the controller 1210. As shown in FIG. 1, the controller 1210 may include a processor 1212 and associated memory 1214 configured to perform a variety of computer-implemented functions. In various embodiments, the controller 1210 is configured to operate the fluid flow apparatus 100 to flow a process fluid, such as inert gas, in accordance with the flow rates, gradients, ratios, and distances depicted and described with regard to FIGS. 2-3.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 1214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

As shown, the controller 1210 may include control logic 1216 stored in memory 1214. The control logic 1216 may include instructions that when executed by the one or more processors 1212 cause the one or more processors 1212 to perform operations, such as steps of the method for control outlined in FIG. 4 and depicted and described in accordance with FIGS. 2-3. In still various embodiments, the memory 1214 may store charts, tables, functions, look ups, etc. corresponding to the flow rates, gradients, ratios, and distances disclosed herein.

Additionally, as shown in FIG. 1, the controller 1210 may also include a communications interface module 1230. In various embodiments, the communications interface module 1230 can include associated electronic circuitry that is used to send and receive data. As such, the communications interface module 1230 of the controller 1210 can be used to receive data from one or more sensors at the additive manufacturing apparatus 200 and/or the fluid flow apparatus 100, such as, but not limited to, flow rate (e.g., flows 101, 102, 103, 104 depicted in FIGS. 2-3), gradients (e.g., velocity gradient 1160 depicted in FIGS. 2-3), ratios, or distances (e.g., distances 1251, 1252, 1253, 1254 depicted in FIGS. 2-3), or calculations or measurements corresponding thereto. It should be appreciated that calculations or measurements corresponding thereto may include, but are not limited to, temperatures, pressures, physical properties, orifice or opening areas and/or volumes, or other physical properties or data that may be utilized to determine or obtain one or more flow rates, gradients, ratios, or distances disclosed herein. In addition, the communications interface module 1230 can also be used to communicate with any other suitable components of the apparatus 200, such as to receive data or send commands to/from the build unit 202, the build platform 210, the powder bed 214, the build unit positioning mechanism 225, one or more motors 216, or other controllable portions of the apparatuses 100, 200.

It should be appreciated that the communications interface module 1230 can be any combination of suitable wired and/or wireless communications interfaces and, thus, can be communicatively coupled to one or more components of the apparatus via a wired and/or wireless connection. As such, the controller 1210 may obtain, determine, store, generate, transmit, or operate any one or more steps of the method for control and operation described herein via a distributed network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. An additive manufacturing apparatus, the additive manufacturing apparatus comprising a build unit comprising a laser window through which an irradiation beam is directed toward a build platform, and wherein a reference axis is extended between the build platform and the laser window; and a fluid flow apparatus comprising a plurality of openings forming a first flow region, a second flow region, a third flow region, and a fourth flow region in adjacent arrangement along the axis in an area between the build platform and the laser window, wherein the first flow region is proximate to the build platform and distal to the laser window, and wherein the fourth flow region is proximate to the laser window and distal to the build platform; and a controller configured to execute instructions that perform operations, the operations comprising flowing, via the second flow region, a flow of fluid along a second distance along the axis at a second velocity range between approximately 1.0 meters per second (m/s) and 6.0 m/s, wherein the second distance is up to 200 millimeters from the first flow region, and wherein the first flow region is extended along a first distance along the axis up to 15 mm from the build platform; and flowing, via the fourth flow region, another flow of fluid along a fourth distance along the axis at a fourth velocity range between approximately 0.1 m/s and 4.5 m/s, wherein the fourth distance is up to 40 mm from the third flow region.

2. The apparatus of any one or more clauses herein, the operations comprising flowing, via the third flow region, a respective flow of fluid along a third distance along the axis at a third velocity range less than a maximum velocity of the second velocity range, wherein the third distance is up to 600 mm from the second flow region.

3. The apparatus of any one or more clauses herein, the operations comprising flowing the third flow of fluid at least 0.1 m/s at the third flow region.

4. The apparatus of any one or more clauses herein, wherein the third distance is extended between 300 mm and 500 mm from the second flow region.

5. The apparatus of any one or more clauses herein, operations comprising generating a maximum spatial gradient between two of the flow regions, wherein the maximum spatial gradient is approximately 100 l/s.

6. The apparatus of any one or more clauses herein, wherein the maximum spatial gradient is from 0.1 m/s at the third flow region to 4.5 m/s.

7. The apparatus of any one or more clauses herein, the operations comprising generating a velocity ratio between two of the flow regions, wherein the velocity ratio is 1/8 or greater.

8. The apparatus of any one or more clauses herein, wherein the velocity ratio is less than 1.

9. The apparatus of any one or more clauses herein, the operations comprising flowing, via the first flow region, a first flow of fluid along between approximately zero m/s and 2 m/s.

10. The apparatus of any one or more clauses herein, wherein the fluid flow apparatus is configured to position the plurality of openings in adjacent arrangement along the axis to provide the respective flows of fluid along a first direction perpendicular to the axis.

11. A method for operating an additive manufacturing apparatus, the method comprising generating a first flow region, a second flow region, a third flow region, and a fourth flow region in sequential adjacent arrangement from a build platform to a laser window, wherein the first flow region is proximate to the build platform, and wherein the fourth flow region is proximate to the laser window; flowing, via the second flow region, a flow of fluid along a second distance along the axis at a second velocity range between approximately 1.0 meters per second (m/s) and 6.0 m/s, wherein the second distance is up to 200 millimeters from the first flow region, and wherein the first flow region is extended along a first distance along the axis up to 15 mm from the build platform; and flowing, via the fourth flow region, another flow of fluid along a fourth distance along the axis at a fourth velocity range between approximately 0.1 m/s and 4.5 m/s, wherein the fourth distance is up to 40 mm from the third flow region.

12. The method of any one or more clauses herein, the method comprising flowing, via the third flow region, a respective flow of fluid along a third distance along the axis at a third velocity range less than a maximum velocity of the second velocity range, wherein the third distance is up to 600 mm from the second flow region.

13. The method of any one or more clauses herein, the method comprising flowing the third flow of fluid at least 0.1 m/s at the third flow region.

14. The method of any one or more clauses herein, the method comprising generating a maximum spatial gradient between two of the flow regions, wherein the maximum spatial gradient is approximately 100 l/s.

15. The method of any one or more clauses herein, wherein the maximum spatial gradient is a function of the third distance at the third flow region, the fourth velocity range, and the second velocity range.

16. The method of any one or more clauses herein, wherein the maximum spatial gradient is from 4.5 m/s to 0.1 m/s.

17. The method of any one or more clauses herein, the operations comprising generating a velocity ratio between two of the flow regions, wherein the velocity ratio is 1/8 or greater.

18. The method of any one or more clauses herein, the method comprising flowing, via the first flow region, a first flow of fluid along between approximately zero m/s and 2 m/s.

19. A fluid flow apparatus for an additive manufacturing apparatus, the fluid flow apparatus comprising a body forming a plurality of openings along an axis between a build platform and a laser window of the additive manufacturing apparatus, the plurality of openings comprising a first opening corresponding to a first flow region, a second opening corresponding to a second flow region, a third opening corresponding to a third flow region, and a fourth opening corresponding to a fourth flow region in sequential adjacent arrangement along the axis, wherein the first flow region is proximate to the build platform and distal to the laser window, and wherein the fourth flow region is proximate to the laser window and distal to the build platform, wherein the second opening is configured to allow a second velocity range of a flow of fluid between approximately 1.0 meters per second (m/s) and 6.0 m/s, and wherein the first opening is configured to allow a first velocity range less than a maximum velocity of the second velocity range, and wherein the third opening is configured to allow a third velocity range less than the maximum velocity of the second velocity range and at least 0.5 m/s, and wherein the fourth opening is configured to allow a fourth velocity range between approximately 0.1 m/s and 4.5 m/s.

20. The fluid flow apparatus of any one or more clauses herein, wherein the first opening is formed along a first distance along the axis from the build platform, wherein the first distance is up to 15 millimeters, and wherein the third opening is formed along a third distance along the axis from the second flow region, wherein the third distance is up to 600 millimeters.

21. The additive manufacturing apparatus of any one or more clauses herein, wherein the controller is configured to execute one or more steps of the method herein.

22. The additive manufacturing apparatus of any one or more clauses herein, the additive manufacturing apparatus comprising the fluid flow apparatus of any one or more clauses herein.

23. A method for recirculation-free flow of fluid at a process chamber of an additive manufacturing apparatus, the method comprising one or more steps of the method of any one or more clauses herein.

24. The apparatus or method of any clause herein, wherein the fluid is an inert gas.

What is claimed is:

1. A method for operating an additive manufacturing apparatus, the method comprising:
generating, via a body with a plurality of openings, a first flow region, a second flow region, a third flow region, and a fourth flow region in sequential adjacent arrangement from a build platform to a laser window, wherein the first flow region is proximate to the build platform, and wherein the fourth flow region is proximate to the laser window, wherein a reference distance extends between the build platform and the laser window, wherein the first flow region corresponds to between 0.1% and 10% of the reference distance, the second flow region corresponds to between 2% and 50% of the reference distance, the third flow region comprises at least 20% of the reference distance, and the fourth flow region comprises 20% or less of the reference distance; and
flowing a flow of fluid, via the body, at separate flow rates in the respective first, second, third, and fourth flow regions to generate:
a maximum spatial gradient between a minimum velocity of the third flow region and a maximum flow velocity of the second flow region or a maximum flow velocity of the fourth flow region of approximately 100 1/s; and
a velocity ratio of 1/8 or greater between the respective first, second, third, and fourth flow regions.

2. The method of claim 1, further comprising:
flowing, via the second flow region, the respective flow of fluid at a second velocity range between approximately 1.0 meters per second (m/s) and 6.0 m/s.

3. The method of claim 1, further comprising:
flowing, via the fourth flow region, the respective flow of fluid at a fourth velocity range between approximately 0.1 m/s and 4.5 m/s.

4. The method of claim 2, further comprising:
flowing, via the third flow region, the respective flow of fluid at a third velocity range less than a maximum velocity of the second velocity range.

5. The method of claim 1, further comprising flowing, via the third flow region, the respective third flow of fluid at least 0.1 m/s.

6. The method of claim 1, further comprising generating the third flow region with a distance up to 600 millimeters measured in a direction corresponding to the reference distance.

7. The method of claim 1, wherein the maximum spatial gradient is from 4.5 m/s to 0.1 m/s.

8. The method of claim 1, wherein the velocity ratio is 1/8 or greater and less than 1.

9. The method of claim 1, further comprising flowing, via the first flow region, the respective flow of fluid between approximately zero m/s and 2 m/s.

* * * * *